United States Patent
Lee et al.

(10) Patent No.: US 9,544,305 B2
(45) Date of Patent: Jan. 10, 2017

(54) SERVER AND METHOD OF PROVIDING SERVER-BASED CAR SECURITY SERVICE, CAR DEVICE AND METHOD OF USING SERVER-BASED CAR SECURITY SERVICE, USER DEVICE AND METHOD OF USING SERVER-BASED CAR SECURITY SERVICE

(75) Inventors: Seung-soo Lee, Seoul (KR); Hong-soo Kim, Seoul (KR); Tae-jeoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 13/360,841

(22) Filed: Jan. 30, 2012

(65) Prior Publication Data

US 2012/0197488 A1    Aug. 2, 2012

(30) Foreign Application Priority Data

Jan. 28, 2011    (KR) .................. 10-2011-0008961

(51) Int. Cl.
   *G06F 7/00*     (2006.01)
   *H04L 29/06*    (2006.01)
   *H04W 4/00*     (2009.01)
   *H04L 29/08*    (2006.01)

(52) U.S. Cl.
   CPC .......... *H04L 63/0861* (2013.01); *H04L 67/12* (2013.01); *H04W 4/005* (2013.01)

(58) Field of Classification Search
   CPC ...... B60R 25/102; B60R 25/252; B60R 25/33; B60R 25/25; B60R 25/255; B60R 25/257; B60R 25/305; B60R 2325/302; B60R 2325/304; B60R 25/04; B60R 25/302; B60W 2550/402; B64D 2045/0055; B64D 45/0015
   USPC .................. 701/36, 32.6, 486, 451, 517, 2
   See application file for complete search history.

(56) References Cited

U.S. PATENT DOCUMENTS

| | | | | |
|---|---|---|---|---|
| 5,557,254 | A  * | 9/1996 | Johnson et al. | ......... 340/426.19 |
| 2003/0193404 | A1 * | 10/2003 | Joao | ......... 340/825.71 |
| 2005/0273219 | A1 * | 12/2005 | Kitao et al. | ......... 701/2 |
| 2006/0003783 | A1 * | 1/2006 | Fukui et al. | ......... 455/517 |
| 2006/0215884 | A1 * | 9/2006 | Ota | ......... 382/118 |
| 2006/0261931 | A1 * | 11/2006 | Cheng | ......... 340/426.1 |
| 2007/0198436 | A1 * | 8/2007 | Weiss | ......... 705/75 |
| 2008/0281907 | A1 * | 11/2008 | Vieira | ......... 709/203 |
| 2008/0291008 | A1 * | 11/2008 | Jeon | ......... 340/539.1 |
| 2010/0295778 | A1 * | 11/2010 | Abe et al. | ......... 345/157 |

(Continued)

FOREIGN PATENT DOCUMENTS

KR    10-2007-0101963 A    10/2007

*Primary Examiner* — Redhwan K Mawari
(74) *Attorney, Agent, or Firm* — Sughrue Mion, PLLC

(57) ABSTRACT

A server-based car security service provides for image and position information to be provided to the server. The server uses the image information to make an authorization determination with respect to the current user. When the user is determined by the server to be an unauthorized user, the server alerts the owner or primary user of the car by sending the alert to a remote user device. The user device displays the image of the current user, and the owner has the opportunity to indicate whether the user is actually an unauthorized user or whether the determination at the server was a misrecognition error. When the user is unauthorized, the owner can request real-time monitoring of the car's position, and also the image inside the car, as well as an outside-of-the-car image.

8 Claims, 7 Drawing Sheets

(56) References Cited

U.S. PATENT DOCUMENTS

2011/0140834 A1* 6/2011 Kiliccote .................... 340/5.2
2012/0197488 A1* 8/2012 Lee et al. .................... 701/36

* cited by examiner

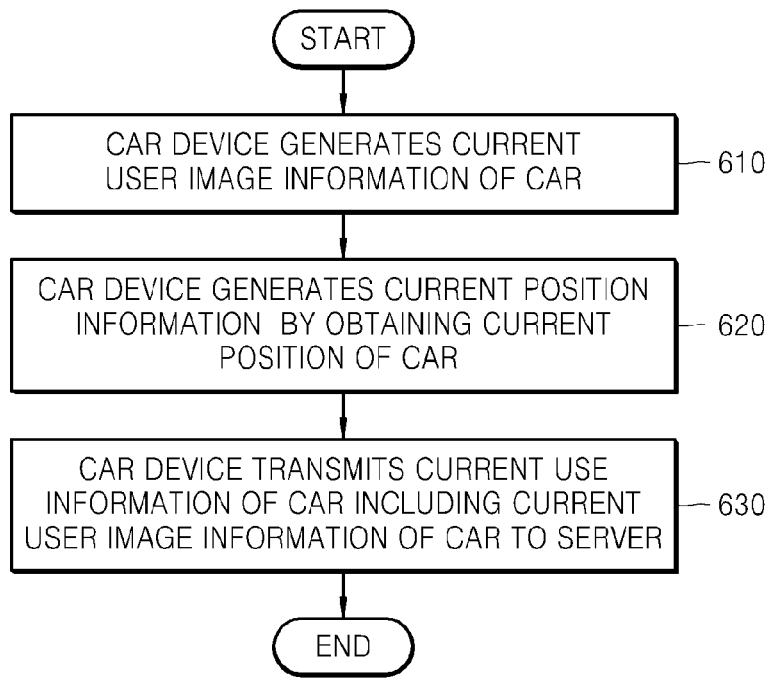
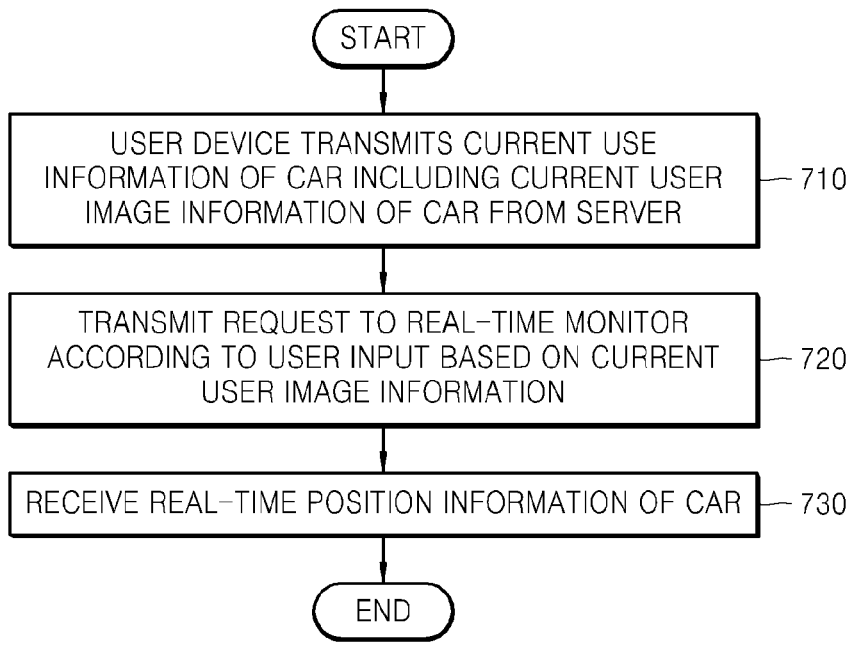

SERVER AND METHOD OF PROVIDING SERVER-BASED CAR SECURITY SERVICE, CAR DEVICE AND METHOD OF USING SERVER-BASED CAR SECURITY SERVICE, USER DEVICE AND METHOD OF USING SERVER-BASED CAR SECURITY SERVICE

CROSS-REFERENCE TO RELATED PATENT APPLICATION

This application claims the benefit of Korean Patent Application No. 10-2011-0008961, filed on Jan. 28, 2011, in the Korean Intellectual Property Office, the disclosure of which is incorporated herein, in its entirety, by reference.

BACKGROUND

1. Field

The inventive concept relates to data communication between devices via a network.

2. Description of the Related Art

Recently, machine-to-machine (M2M) related techniques and services have been receiving more attention. M2M technology refers to a novel network infrastructure. M2M allows a network infrastructure consisting of wide band networks (such as a mobile communication or a WiBro network) and an Internet addressing system to expand or associate with areas between a human and an object or areas between an object and an object. M2M is capable of conveniently sensing and transmitting the objects' data by using the mobility of the object. This secures the expandability of a network at low cost. M2M technology is being actively researched and developed, by mobile network operators, using communication networks and IT systems, due to its business potential as a new profit source.

SUMMARY

According to an exemplary embodiment, there is provided a method of providing a server-based car security service of a car by using a server, the method comprising: receiving, at the server, current user image information, obtained by capturing from a car device an image of a current user of a car; determining at the server whether the current user of the current user image information is an authorized user, based on authorized user information of the car, registered to the server; and transmitting current use information of the car, including the current user image information of the car, to a user device of a main user of the car, based on a determination about the authorized user by the server.

According to another exemplary embodiment, there is provided a method of using a car security service of a car device receiving a server-based car security service, the method comprising: generating current user image information of a car by using a camera mounted in the car; receiving a satellite signal indicating a current position of the car, and generating position information including GPS information or a current map image about the current position of the car; and transmitting to the server at least one of the current user image information and the position information from the car device, wherein the current use information of the car including at least one of the current user image information and the position information is transmitted from the server to the user device of a main user of the car.

According to another exemplary embodiment, there is provided a method for a user device receiving a server-based car security service to use a car security service by, the method comprising: receiving from the server current use information related to the car, including current user image information from the car, wherein the current use information related to the car is transmitted by the server based on a result of comparing current user image information obtained by capturing an image of a current user of the car, and received by the server from the car device, with authorized user information of the car registered to the server.

According to another exemplary embodiment, there is provided a server providing a car security service, comprising: a communication unit communicating with a car device and the main user device of the main user; a current user image information receiving unit through which the server receives current user image information obtained by capturing an image of a current user of the car, which is received from the car device; an authorized user determining unit with which the server determines whether or not the current user, as indicated by the current user image information, is an authorized user based on authorized user information relating to the car registered to the server; and a current use information transmitting unit with which the server transmits the current use information of the car, including the current user image information of the car, to the user device of the main user of the car based on the determination about the authorized user.

According to another exemplary embodiment, there is provided a car device providing a server-based car security service, comprising: a current user image information generating unit that generates current user image information of a car by using a camera mounted in or on the car; a position information generating unit that receives a satellite signal indicating a current position of the car, and generates position information including GPS information and/or a current map image representing a current position of the car; and a current use information transmitting unit transmitting at least one of the current user image information and the position information to the server, wherein the current use information about the car includes at least one of the current user image information, and the position information is transmitted from the server to the user device of a main user of the car.

According to another exemplary embodiment, there is provided a user device that is provided with a server-based car security service, the user device comprising: a user input unit that responds to a user input to transmit a security request, with respect to a car device, to the server; a current car use information receiving unit that receives current use information including current user image information of the car; a screen outputting unit that outputs an image received from the server on a screen; and a car security request transmitting unit that transmits the security request based on the user input, to the server, wherein the current use information is transmitted by the server based on a result of comparing current user image information obtained by capturing an image of a current user of the car, which is received by the server from the car device, with authorized user information of the car registered to the server.

According to another exemplary embodiment, there is provided a computer readable recording medium having embodied thereon a program for executing the method of providing a car security service by using a server.

According to another exemplary embodiment, there is provided a computer readable recording medium having embodied thereon a program for executing the method of using a car security service of a car device.

According to another exemplary embodiment, there is provided a computer readable recording medium having embodied thereon a program for executing the method of using a car security service by a user device.

BRIEF DESCRIPTION OF THE DRAWINGS

The above and other features and advantages of the inventive concept will become more apparent by describing in detail exemplary embodiments thereof with reference to the attached drawings in which:

FIG. 6 is a flowchart illustrating a method of using a server-based car security service of a car device, according to an exemplary embodiment;

FIG. 7 is a flowchart illustrating a method of using a server-based car security service of a user device, according to an exemplary embodiment.

DETAILED DESCRIPTION

Figure 1:
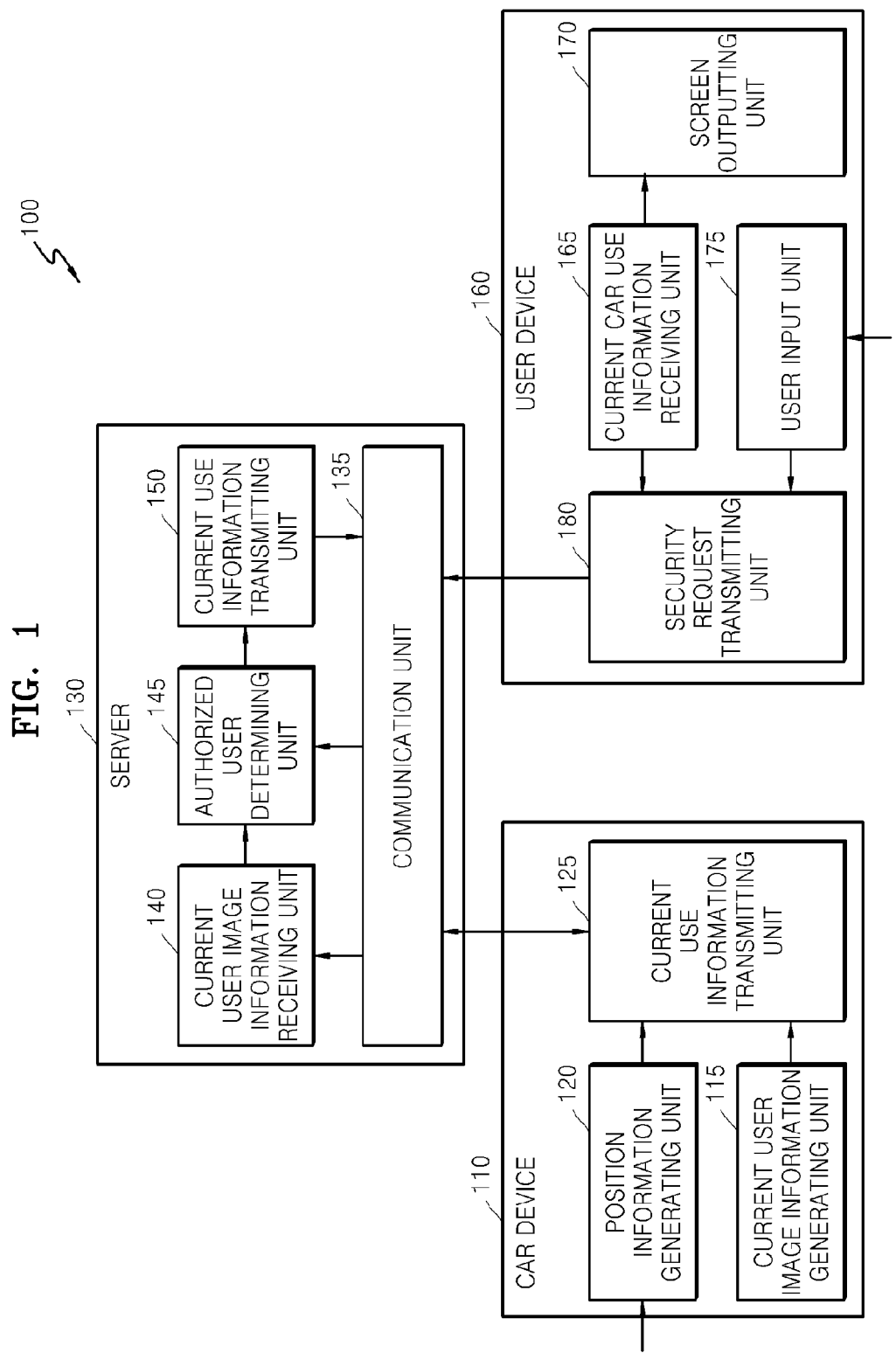
FIG. 1 is a block diagram illustrating a system for providing a server-based car security service, according to an exemplary embodiment.

FIG. 1 is a block diagram illustrating a system 100 for providing a server-based car security service, according to an exemplary embodiment.

The system 100 for providing a server-based car security service includes a car device 110, a server 130, and a user device 160. The server 130 relays data between the user device 160 of a main user of the car and the car device 110. A server-based car security service according to an exemplary embodiment may be provided for cars linked with the car device 110. Herein, the "main user" of the car may be the owner of the car, or a user who is the person who most frequently drives the car.

The car device 110 may be any wireless or wired device that can be mounted to or linked to the car, such as a navigation device or a black box for a vehicle. The car device 110 includes a communication module for communicating with the server 130. For example, the car device 110 may employ a communication module that supports 3G, or Wi-Fi wireless communication for 3G, or Wi-Fi-based wireless communication with the server 130.

The car device 110 may include a camera module to capture an image of a current state of the car. Alternatively, the car device 110 may include an external camera connecting module to obtain an image that is captured by interacting with an external camera that is mounted to the car. That is, the car device 110 may use any camera that is either mounted on the car or is capable of capturing an image of the inside or outside of the car. Hereinafter, a camera used by the car device 110 will be referred to as a "car camera."

The car device 110 may include a position information obtaining module for obtaining current position information of the car. For example, the car device 110 may include a GPS information generating module. A GPS information generating module generates GPS information by receiving a position signal of the car from GPS satellites. The GPS information generating module may also generate GPS information from an external GPS device connecting module that obtains the GPS information about the car's position by interacting with an external GPS device. Here, an "external" GPS device does not mean that the GPS devices outside of the car; it just means that the GPS device need not necessarily be an integral part of the module. For example, the car device could take advantage of a GPS device previously installed in the car.

The car device 110 may include a current user image information generating unit 115, a position information generating unit 120, and a current use information transmitting unit 125.

When the car device 110 senses that the car is being used, the current user image information generating unit 115 may obtain an image of the current user of the car. The position information generating unit 120 may generate current position information (such as GPS information) about the current position of the car. The current use information transmitting unit 125 may transmit the image of the current user of the car (generated by the current user image information generating unit 115) and the current position information (generated by the position information generating unit 120) to the server 130. Also, if the current user image information generating unit 115 obtains an image of the outside of the car, the current use information transmitting unit 125 may transmit the car outside image to the server 130. The server 130 may include a communication unit 135, a current user image information receiving unit 140, an authorized user determining unit 145, and a current use information transmitting unit 150.

The communication unit 135 of the server 130 may perform wired or wireless IP communication with the car device 110 or the user device 160. The current user image information receiving unit 140 may receive current user image information from the car device 110 via the communication unit 135.

The authorized user determining unit 145 may store authorized user information about registered users who are allowed to use the car. The authorized user information may include information about at least one registered person, including the main user of the car.

The authorized user determining unit 145 may determine whether a current user of the car is an authorized user by reading the current user image information of the car output from the current user image information receiving unit 140. Once the authorized user determining unit 145 determines that the current user is not an authorized user of the car, the authorized user determining unit 145 may transmit a notification message, to the user device 160, notifying that the car is being used by someone who is not registered as an authorized user.

The current use information transmitting unit 150 may transmit, to the user device 160, current car use information including the current position information of the car, which is received from the car device 110, and/or the current user image information, and/or the car outside image via the communication unit 135.

The user device 160 may include a current car use information receiving unit 165, a screen outputting unit 170, a user input unit 175, and a security request transmitting unit 180. The user device 160 may include a machine-to-machine (M2M) communication-based device or a mobile communication terminal, or the like, which is capable of communicating data not only via the server 130 but also with other types of devices. The user device 160 may include at least one device used by the main user.

The current car use information receiving unit 165 and the security request transmitting unit 180 may support 3G or Wi-Fi wireless communication to perform 3G or Wi-Fi wireless communication with the server 130 3G or Wi-Fi data communication via IP access.

The current car use information receiving unit 165 may receive the current user image information related to the car from the server 130, and the screen outputting unit 170 may render the current user image information so as to display the current user image on a display screen of the user device 160.

The user input unit 175 may receive, from the user, an indication that the current user image is an incorrectly recognized image. The user input may also constitute a request to register an additional user, which may require registration of the current user image information even though the current user of the car is not yet registered as an authorized user. The user input may also indicate a request to correct the authorized user information. Moreover, the user input may ask to determine that the current user is a non-authorized user and to execute a warning mode.

When a user input is transmitted by the user input unit 175, the security request transmitting unit 180 may transmit to the server 130 a recheck request in response to an indication of a mistaken recognition of the current user image; it may transmit an additional registration request so as to add the current user image information as authorized user information; it may also transmit a correction request to correct the authorized user information; it may further transmit a request to execute a warning mode.

In response to the recheck request for the current user image and the additional registration request by the user device 160, the current user image information may be used as learning data by the authorized user determining unit 145 of the server 130. In response to a request to execute a warning mode, by the user device 160, the server 130 may continuously monitor the current position information from the car device 110 and transmit the same to the user device 160. The screen outputting unit 170 of the user device 160 may continuously render the current position information of the car and display the same on the display screen so that the main user of the car can trace the current position of the car.

According to the system 100 for providing a server-based car security service, the main user of the car may be provided with car security service by the server 130, taking advantage of the car device 110 which can be linked to a car camera and is capable of communicating with the server 130. This system does not require, and is separate from, a car theft preventing device that is mounted on or in the car.

Also, even when the car is a long distance from the main user of the car, the car security service provided by the server 130 may be provided via the user device 160 that is kept near the main user. The main user may check current user image information obtained by the car device 110 even though the car is a long distance away. The information output via the server 130 is received by the user device 160, and if the current user is not an authorized user, the main user may remotely control the car device 110 via the server 130 to send a report to the police or to execute a theft warning mode.

Even when an unauthorized user is driving the car, the user device 160 is capable of continuously obtaining the current user image information and the current position information that the car device 110 provides in real-time via the server 130. The current position of a stolen car may thus easily be traced. In addition, the data needed to apprehend the suspected car thief may be obtained.

Hereinafter, detailed operations of the car device 110, the server 130, and the user device 160 for a server-based car security service will be described in detail with reference to FIGS. 2, 3, and 4.

Figure 2:
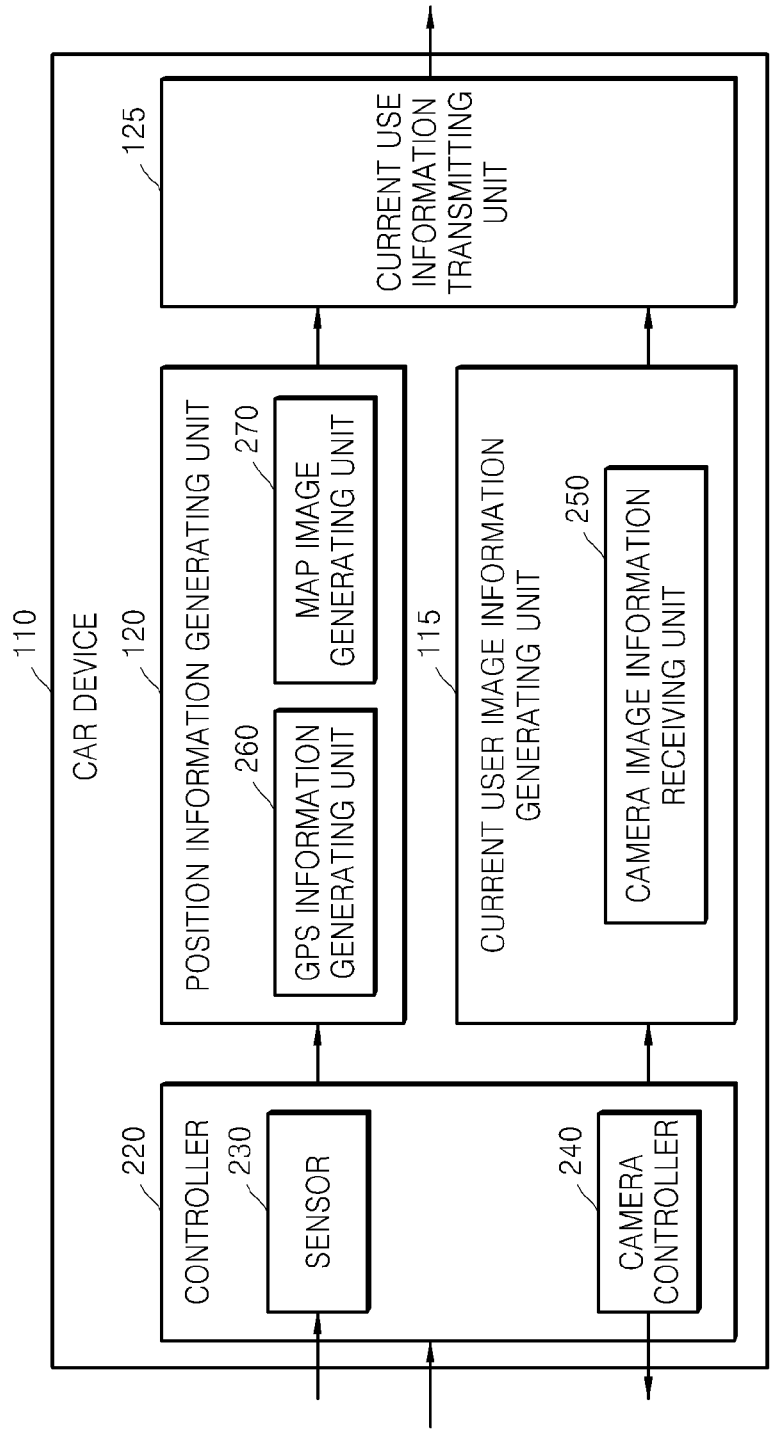
FIG. 2 is a detailed block diagram illustrating a car device using a server-based car security service, according to an exemplary embodiment.

FIG. 2 is a detailed block diagram illustrating the car device 110 using a server-based car security service, according to an exemplary embodiment.

The current user image information generating unit 115 may generate current user image information of the car by using a car camera. Also, the current user image information generating unit 115 may generate image information obtained by capturing an image of the outside of the car by using the car camera. The current user image information generating unit 115 may include a camera image information receiving unit 250 that is linked to the car camera that is located outside the car device 110 and receives images captured by the car camera.

The position information generating unit 120 may include a GPS information generating unit 260 that generates GPS information about a current position of the car upon receiving a signal from a satellite indicating a current position of the car and a map image generating unit 270 that generates a map image by using GPS information or links GPS information to the map image. The position information generating unit 120 may transmit GPS information or a map image to the current use information transmitting unit 125 as the current position information.

The current use information transmitting unit 125 may transmit at least one of the current user image information, the position information, and the car outside image information as the current use information of the car.

A controller 220 of the car device 110 may include a sensor 230 and a camera controller 240.

The sensor 230 may sense a current usage status of the car in real-time. The sensor 230 may include a GPS receiver module and sense whether the car is currently moving or not, based on a signal indicating a current position of the car, which is received from the satellite. In addition, the sensor 230 includes an operating sensor or a temperature sensor to sense movement of the car or its components, or the shaking of the car, or it's temperature, or the like, to determine whether the car is currently being driven. Alternatively, if an abrupt change has occurred in an image sequence of an image obtained by capturing an inside of the car by using the car camera, the sensor 230 may sense whether a vehicle door has been opened or closed, or whether a person got into or out of the car.

Since various types of usage status may be present, such as the opening and closing of the vehicle doors, the presence of new persons in the car, or the driving of the car, a usage grade may be determined according to the usage status. Usage grades for the sensor 230 to make a determination that the car is currently in use may be variably adjusted according to a required car security level. In other words, if strict car security is desired, the opening and closing of the vehicle doors may be regarded as indicating that the car is being used; on the other hand, if the theft of the car is to be prevented, more weight may be given to indications that the car is being driven.

The camera controller 240 may control the capturing point, the capturing angle, the frame rate, and/or the image quality of the car camera.

If the sensor 230 senses a current usage status of the car, the controller 220 may exercise control such that the current user image information generating unit 115 obtains the current user image information and that the position information generating unit 120 generates the current position information of the car.

When the sensor 230 senses for the first time that the car is currently in use, the current use information transmitting unit 125 may transmit first current use information, of the car, to the server 130.

In response to the server 130 communicating about the first current use information of the car, the controller 220 of the car device 110 may receive from the server 130 a request to real-time monitor the car, including a request to provide real-time position information of the car. If the main user of the car has confirmed that the current user is not an authorized user, a real-time monitoring request may be received from the user device 160.

According to the real-time monitoring request, the position information generating unit 120 may continuously generate at least one kind of real-time position information selected from among the real-time GPS information and the real-time map image information. The current use information transmitting unit 125 may transmit the real-time position information to the server 130. According to the real-time monitoring request, the current use information transmitting unit 125 may transmit the real-time user image information generated by the current user image information generating unit 115 to the server 130. In this way, the real-time current use information transmitted to the server 130 may be transmitted to the user device 160 via the server 130.

If a request to execute a warning mode, with respect to the current user, is received from the server 130 in response to the first current use information, the controller 220 of the car device 110 may execute a warning mode that warns the main user about the current unauthorized use of the car.

If a request to provide current user image information or current position information is received from the server 130 before the sensor 230 senses the current usage status of the car, the controller 220 may control the car device 110 according to a server request such that the current user image information generating unit 115 obtains the current user image information or the car outside image information, and that the position information generating unit 120 generates current position information of the car.

The current use information such as the current user image information and the current position information, and various requests such as the request to real-time monitor described above, are transmitted by the user device 160 to the server 130, and may also be transmitted to the car device 110 via the server 130.

The car camera may capture an image of not only the current user of the car, but also of the outside of the car. To precisely capture an image of the outside of the car as the driving speed of the car increases, it is preferable to increase the frame rate of the car camera. On the other hand, when the driving speed of the car is low, or when the car stops, the outside of the car may be precisely captured even if the frame rate of the car camera is low.

The camera controller 240 may control the frame rate of the car camera based on the driving speed of the car. The camera controller 240 may obtain the current driving speed of the car based on a satellite signal or GPS information indicating the position of the car. The camera controller 240 may set the frame rate of the car camera to be based on the current driving speed of the car. That is to say, it is preferable that the lower the current driving speed of the car, the lower the frame rate of the car camera, and the higher the current driving speed of the car, the higher the frame rate.

The camera controller 240 may set the frame rate of the car camera to be a maximum value when the current driving speed of the car exceeds a predetermined threshold or critical value (e.g., 60 km/h). Also, the camera controller 240 may set the frame rate of the car camera to be the lowest when the car has stopped. The highest frame rate or the lowest frame rate may be variably set.

The camera controller 240 may receive camera control information from the server 130 to set the highest and lowest frame rates of the car camera. Likewise, the frame rate that the camera controller 240 uses may be set so as to use a predetermined threshold driving speed that triggers the highest or the lowest frame rate. Similarly, the frame rate that the camera controller 240 uses may be set based on a ratio of the frame rate to the car driving speed.

When the camera controller 240 adjusts the frame rate of the car camera to be in proportion to the driving speed of the car, the car camera may thereby more precisely capture an image of surrounding environment, even when the car is driven at a high speed. Also, when the car drives at a low speed or has stopped, the frame rate of the car camera is made to decrease, and thus the generation of repeated images is prevented, thereby saving data storage space and efficiently streaming or transmitting data to a remote place.

Accordingly, the car device 110 may obtain information about the current user image, the map, and the position of the car, and the image of what is outside of the car.

Figure 3:
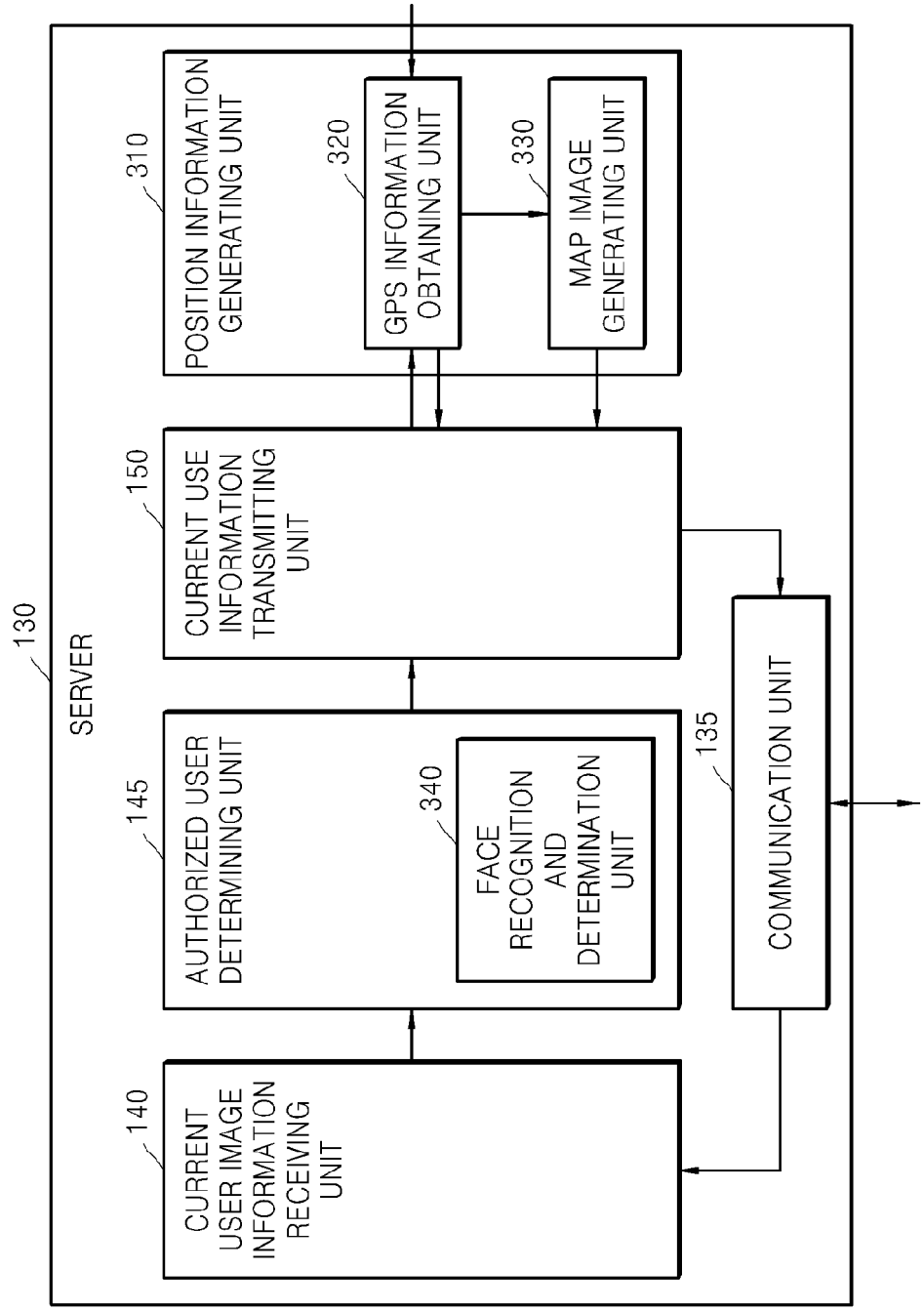
FIG. 3 is a detailed block diagram illustrating a server using a server-based car security service, according to an exemplary embodiment.

FIG. 3 is a detailed block diagram illustrating the server 130 using a server-based car security service, according to an exemplary embodiment.

The current user image information receiving unit 140 may receive current position information including current GPS information or a map image of the car from the car device 110. Also, the current user image information receiving unit 140 may receive image information about what is outside of the car from the car device 110.

Upon receiving current user image information, from the car device 110, the current user image information receiving unit 140 may transmit the current user image information to the authorized user determining unit 145 to determine whether or not the current user of the car is an authorized user.

The server 130 may first receive via the communication unit 135 a request from the user device 160 to provide the car's current user image information, before receiving the current user image information from the car device 110. In this situation, the server 130 transmits via the communication unit 135 a request to the car device 110 to provide the current user image information. Then the current user image information is received from the car device 110 in response to this request, the current user image information may be transmitted to the user device 160, based on a determination from the authorized user determining unit 145.

The authorized user determining unit 145 may determine whether the current user image information received from the car device 110 is that of an authorized user, based on the authorized user information of the car previously stored in the server 130. For example, a face recognition and determination unit 340 may recognize the face of the current user by reading the current user image information and comparing it with the faces of users previously registered with the server 130 as being authorized. Based on the comparison the face recognition and determination unit 340 makes a judgment as to whether the current user is a registered person who is allowed to use the car.

The current use information transmitting unit 150 may transmit the current use information of the car, including the car's current user image information, to the user device 160 of the main user of the car via the communication unit 135, based on a result of determination of the authorized user determining unit 145. The current use information of the car may include at least one of the current user image information, the current position information, and the car outside image information received from the car device 110.

When the current user is determined to be an unauthorized user, based on the determination of the authorized user determining unit 145, the current use information transmitting unit 150 may transmit a notification message to the user device 160 notifying the main user that the car is currently in use by a person who is an unauthorized user If a request to provide current use information is received in response to the notification message from the user device 160, the current use information transmitting unit 150 may transmit the current use information to the car device 110.

The server 130 may receive from the user device 160 a number of different requests including: (a) a recheck request due to the mistaken recognition of the current user image, (b) a request to add the current user image information to that which is already registered as authorized user information, (c) a correction request to correct the authorized user information, (d) a request to execute a warning mode, or (e) a request to activate real-time monitoring of the car, in response to the request to provide the current use information.

Upon receiving a recheck request due to the mistaken recognition of the current user image, the server 130 may request the car device 110 to retransmit the current user image information.

When the server 130 receives a request to add the current user image information to what has already been registered as authorized user information, the authorized user determining unit 145 may update the authorized user information by complying. The purpose of a correction request received from the user device 160 is to correct the authorized user information. When such a request is received, the authorized user determining unit 145 updates the car's authorized user information by correcting it in accordance with the content of the correction request.

When the server 130 receives from the user device 160 a request to provide current position information of the car and a request to real-time monitor the car, the current use information transmitting unit 150 may request the car device 110 to provide real-time position information about the car. Upon receiving such real-time position information (which may include real-time GPS information or a real-time map image of the car) from the car device 110, in response to the request to provide real-time position information, the current use information transmitting unit 150 may transmit the real-time position information to the user device 160. If a request to provide real-time user image information is transmitted by the user device 160 with the request to real-time monitor the car, the car device 110 may be queried for the car's real-time position information and real-time user image information, and the real-time current use information received from the car device 110 may be transmitted to the user device 160.

The server 130 may receive from the user device 160 a request to execute a warning mode with respect to the current user of the car. As the current use information transmitting unit 150 transmits a request to execute a warning mode to the car device 110, a car security service based on the server 130 may be implemented.

A GPS information obtaining unit 320 of the position information generating unit 310 may be able to obtain from the car device 110 only a satellite signal or GPS information indicating the position of the car. The GPS information obtaining unit 320 may generate GPS information when only a satellite signal is obtained, and the map image generating unit 330 may generate a map image of the position of the car by using the GPS information of the GPS information obtaining unit 320. The position information generating unit 310 may link the satellite signal or GPS information received from the car device 110 or a satellite to the map image stored in the server 130. GPS information or map images about a current position or a real-time position of the car generated by the position information generating unit 310 may be transmitted to the user device 160 as current use information.

The server 130 may set the frame rate of the car camera. The frame rate of the car camera may be set based on the driving speed of the car.

The server 130 may also set the frame rate of the car camera in real time, again based on the current driving speed of the car. The server 130 may receive information about the current driving speed of the car directly from the car device 110 or may measure the current driving speed of the car based on a satellite signal or on GPS information. Also, the server 130 may set the frame rate of the car camera in real-time by determining whether the frame rate of the car camera is too fast or too slow by comparing the frame rate of the car camera with the current driving speed. This comparison can be based on the quality of the images being obtained from the car device 110 using the car's outside camera. In this situation, the server 130 may determine an appropriate frame rate for the car camera, in real-time, based on the current driving speed of the car, and transmit the thus-determined frame rate to the car device 110.

The server 130 may set the frame rate of the car camera to be in proportion to the current driving speed of the car. If the current driving speed of the car exceeds a predetermined critical or threshold value, the frame rate of the car camera may be set to a maximum value, and if the car has stopped, the frame rate of the car camera may be set to a minimum value. The maximum and minimum values for the car camera's frame rate may thus be selectable by the server 130.

The server 130 may set and transmit to the car device 110 a variety of camera control information such as: (a) the maximum and minimum frame rates of the car camera, (b) predetermined critical value or threshold information for setting the car camera's frame rate to maximum and/or minimum values, (c) a ratio for the car device 110 to use so as to determine the proper frame rate for the car's camera, based on the driving speed of the car.

The main user of the car may have a number of user devices. Accordingly, the server 130 may select at least one from among a plurality of user devices of the main user of the car and transmit current use information received from the car device 110 to the selected at least one device. The server 130 may also select all of the user devices and transmit the information to all of them.

Multiple user levels are possible. For example, there can be one level of user that is allowed into the car, and another level of user that is not only allowed into the car but is also allowed to drive the car. The different user levels can also be thought of as usage grades. The authorized user determining unit 145 may determine a usage grade that is authorized from among the defined usage grades. Accordingly, upon receiving an additional registration request to add a current user to the authorized user information from the user device 160, the authorized user determining unit 145 may specify the user level of the current user and add that to the authorized user information.

Figure 4:
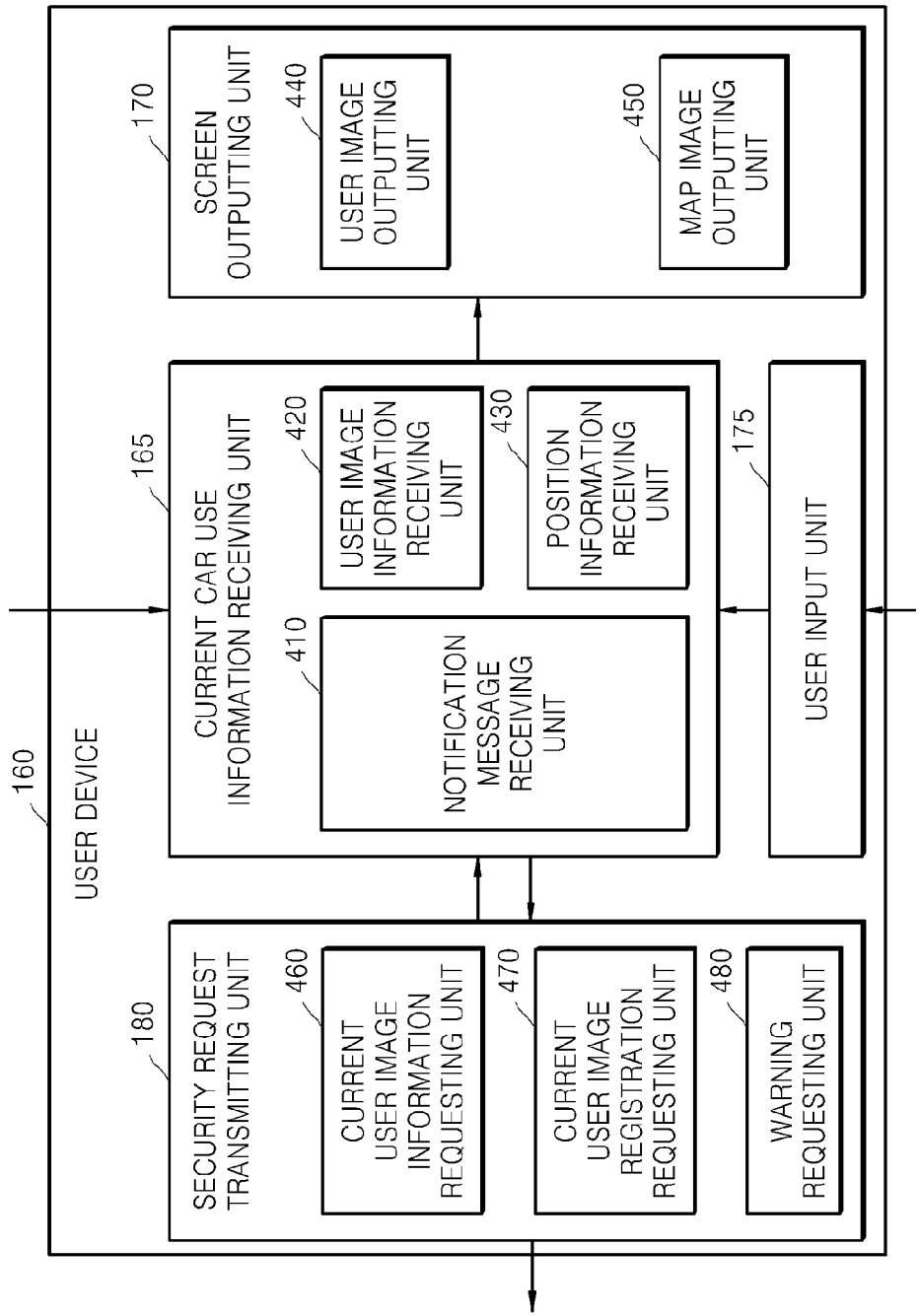
FIG. 4 is a detailed block diagram illustrating a user device using a server-based car security service, according to an exemplary embodiment.

FIG. 4 is a detailed block diagram illustrating the user device 160 that uses a server-based car security service, according to an exemplary embodiment.

The current car use information receiving unit 165 may receive current use information about the car from the server 130. The current use information about the car, which is received from the server 130, is information that is selectively transmitted based on the result of comparing the current user image information of the car (that the server 130 has received from the car device 160) with the authorized user information stored in the server 130.

The current car use information receiving unit 165 may receive various information from the server 130, and may include a notification message receiving unit 410, a user image information receiving unit 420, and a position information receiving unit 430 according to the types of received information.

When the user image information receiving unit 420 receives current user image information of the car from the server 130, a user screen outputting unit 440 of the screen outputting unit 170 may render a current user image and display the same on a screen. When the position information receiving unit 430 receives current map image information of the car from the server 130, a map screen outputting unit 450 of the screen outputting unit 170 may display a current map image showing a moving path of the car on the screen. Also, when the current car use information receiving unit 165 receives outside-the-car image information from the server 130, the screen outputting unit 170 may render an outside-the-car image and display the same on the screen.

If the position information receiving unit 430 has received only a satellite signal or GPS information about the position of the car from the server 130, the map screen outputting unit 450 may generate a map image about the current position of the car based on the received satellite signal or the GPS information, and output the map image on the screen.

The notification message receiving unit 410 may receive a notification message notifying that the car is currently in use by an unauthorized user, before the current user image information or the current use information are received from the server 130. The screen outputting unit 170 may display the notification message on the screen, or may generate a sound or a vibration to notify that the notification message notifying about an unauthorized use of the car has been received. The user device 160 may also perform an alarm operation to notify the user about an unauthorized use of the car.

After the user device 160 has performed the alarm operation to notify the user about the unauthorized use of the car, a user input for receiving current use information of the car may be received via the user input unit 175. Accordingly, a current user image information requesting unit 460 of the security request transmitting unit 180 may request the server 130 to transmit the current user image information from him the car device 110.

The main user may check the current user image displayed on the screen to determine whether or not the current user is actually allowed to use the. If the main user affirms that the current user is not allowed to use the car, the main user may give an input to the user input unit 175 to request the execution of a warning mode operation of the car device 110 or the execution of real-time monitoring.

In response to a user input, a warning requesting unit 480 of the security request transmitting unit 180 may transmit to the server 130 a request to carry out real-time monitoring of the car and also transmit a request to provide real-time position information about the car. In response to the request to carry out real-time monitoring of the car by the user device 160, real-time position information including at least one of a real-time satellite signal, real-time GPS information, and a real-time map image of the car may be received from the server 130. In addition, if there is a user input the requests a real-time current user image, the real-time current user image information may be received from the server 130. The real-time position information of the car, which is received from the car device 110, may also be transmitted via the server 130, or real-time position information that the server 130 directly obtained or generated may be transmitted.

If the main user of the car checks the user device 160 and decides that the current user of the car is actually allowed to use the car, the main user has the opportunity to submit an additional registration request via the user input unit 175, so as to register the current user of the car as part of the authorized user information. Also, the user may input a correction request to correct the authorized user information that is input via the user input unit 175.

According to a user input based on the current user image information, the current user image registration requesting unit 470 of the security request transmitting unit 180 may transmit to the server 130 an additional registration request to add the current user image to the authorized user information of the car. Also, according to a correction request to correct the authorized user information input via the user input unit 175, the current user image registration requesting unit 470 of the security request transmitting unit 180 may transmit to the server 130 the correction request to correct the authorized user information.

If the user cannot recognize the current user image displayed on the screen, the user may input via the user input unit 175*a* retransmission request to retransmit the current user image information. In response to the retransmission request to retransmit the current user image information, the current user image information requesting unit 460 of the security request transmitting unit 180 may transmit to the server 130 a retransmission request to retransmit the current user image.

Even before a notification message notifying the main user about current use information of the car or an unauthorized use of the car is received from the server 130, if a request to provide current user image information of the user is input via the user input unit 175, the current user image information requesting unit 460 of the security request transmitting unit 180 may transmit to the server 130*a* request to provide current user image information of the user. Consequently, the current car use information receiving unit 165 may receive current user image information of the car that the server 130 has obtained from the car device 110 based on the request of the user device 160.

The user device 160 may set camera control information so as to control the frame rate of the car camera in order to improve image quality or to set the photographing parameters of the car camera and transmit the camera control information to the server 130.

The user device 160 may set, according to user inputs, car usage grade information about usage levels determined according to at least one usage status in which the car is used, authorized user grade information about car user levels determined according to usage grades, or the like. The user device 160 may transmit to the server 130 the car usage grade information or the authorized user grade information.

Figure 5:
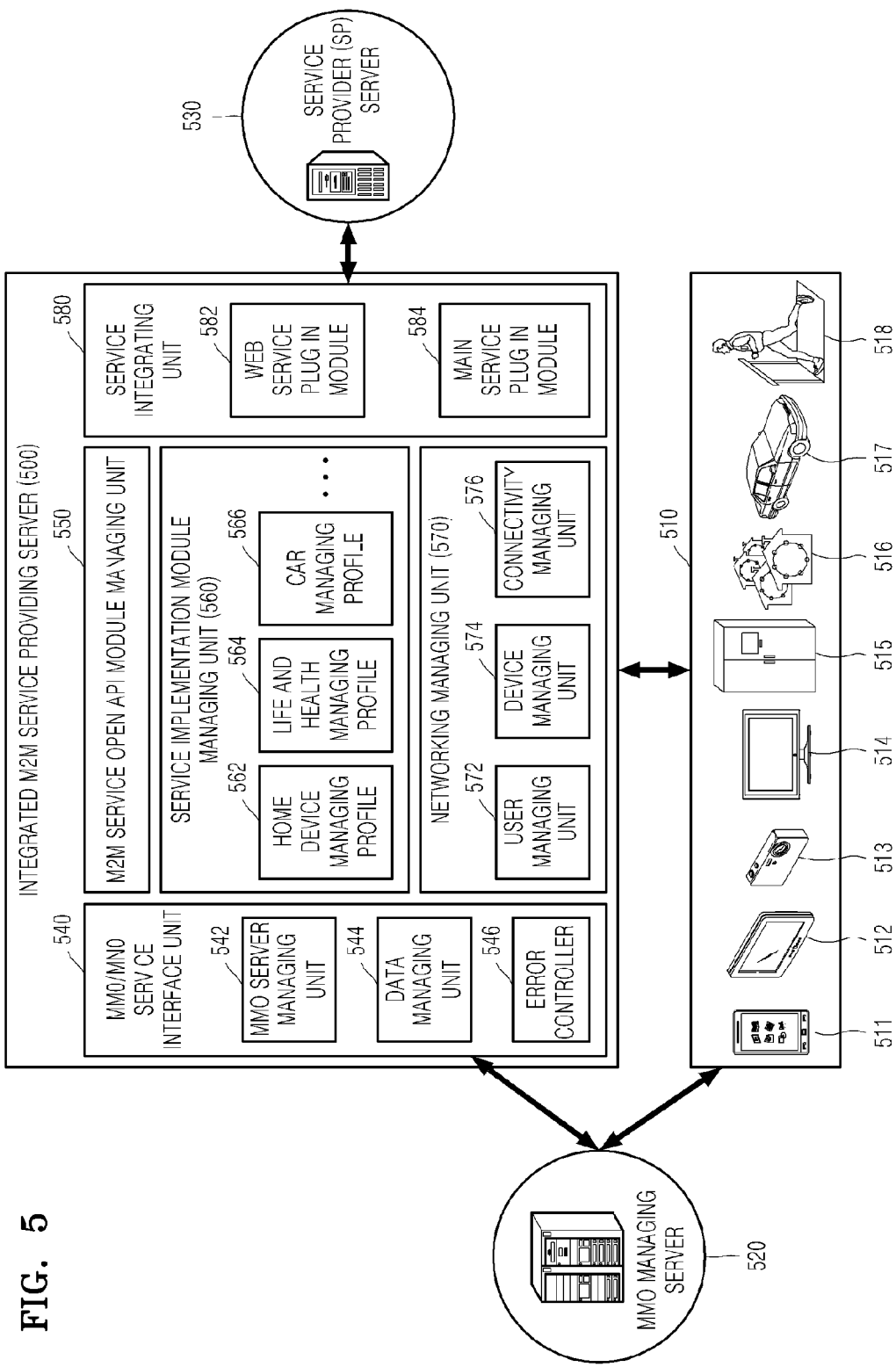
FIG. 5 is a block diagram illustrating an integrated sever for providing a machine-to-machine (M2M) service including a car security service, according to an exemplary embodiment.

FIG. 5 is a block diagram illustrating an integrated M2M service providing server 500 for providing a M2M service including a car security service, according to an exemplary embodiment.

The integrated M2M service providing server 500 is a service enabler server that implements an intelligent network linking an external communication network of user devices 510 such as a mobile terminal with Internet services to provide various M2M services between various devices.

The integrated M2M service providing server 500 includes a M2M mobile operator (MMO)/mobile network operator (MNO) service interface unit 540 (MMO/MNO), a M2M service open application programming interface (API) module managing unit 550, a service implementation module managing unit 560, a networking managing unit 570, and a service integrating unit 580.

The integrated M2M service providing server 500 may transmit or receive data to/from the user devices 510 based on a M2M protocol. The user devices 510 may include all kinds of devices that are able to receive various M2M services provided by the integrated M2M service providing server 500 by implementing M2M communication based on a M2M protocol. For example, the user devices 510 may be smart phones 511, tablet PCs 512, cameras or camcorders 513, display devices 514 such as TVs, home appliances 515 such as refrigerators, home networks 516 including user home networks and linkable external home networks, cars 517, exercise equipment 518, or the like.

The integrated M2M service providing server 500 performs data communication with the MNO managing server 520. The managing server 520 is located outside a home network and operates a MMO service or a MNO service, via the MMO/MNO service interface unit 540.

A MMO/MNO service provider who operates MMO/MNO services is a mobile communication provider who provides a mobile communication service by using a mobile communication network established by other mobile communication providers. A MMO/MNO service provider provides MMO/MNO services by using previously established mobile communication networks, and gains profits from customers through subscription fees, call charges, and additional service charges. The service provider pays the mobile communication network provider for using the mobile communication network and/or communication fees.

For example, the MMO/MNO service interface unit 540 may transmit or receive device management information to/from the MMO management server 520 based on a MMO-specific protocol. The MMO/MNO service interface unit 540 may include a MMO server managing unit 542 managing at least one MMO managing server 520 providing MMO/MNO services to customers using the user devices 510 the integrated M2M service providing server 500, a data managing unit 544 and an error controller 546 respectively managing and controlling data and errors generated while receiving services of the MMO managing server 520.

The MMO managing unit 542 may provide a common interface for external MMO providers who are to provide MMO/MNO services via the integrated M2M service providing server 500.

The networking managing unit 570 may include a user managing unit 572, a device managing unit 574, and a connectivity managing unit 576. The network managing unit 570 may thus manage user information, device information, and connectivity status for networking with the user devices 510. The network managing unit 570 may observe the status of the user devices 510 so as to manage them and control the operations of the user devices 510.

The service integrating unit 580 may collect various services provided by a service provider server 530 to integrally provide various M2M services. The service integrating unit 580 may implement a main service plug-in module 584 and a web service plug-in module 582 in order to provide not only a main service provided by an operating subject of the integrated M2M service providing server 500 but also a web service provided by external service providers. Through the main service plug-in module 584 and the web service plug-in module 582, data communication with the service provider server 530 such as downloading applications from the service provider server 530 may be performed. The web service plug-in module 582 may provide a common interface for external service providers such as an external website provider.

The M2M service open API module managing unit 550 of the integrated M2M service providing server 500 provides M2M service interfaces in the form of APIs as a common interface used to integrate and organize various M2M services that are provided to the various user devices 510. For an external service provider to easily use and extend its function later, an open API-form of M2M service interface may be provided. Accordingly, service providers may implement M2M services such as mash-up services by using a M2M service open API provided by the M2M service open API module managing unit 550, and M2M services of various service providers may be integrated through the service integrating unit 580.

The service implementation module managing unit 560 may manage profiles used to implement various M2M services provided by the integrated M2M service providing server 500. By using the service implementation module managing unit 560, service profiles such as web applications for implementing a main service and external web services that are collected using the service integrating unit 580 may be managed.

The service implementation module managing unit 560 may provide, as M2M services provided by the integrated M2M service providing server 500, a home device managing profile 562 managing and controlling home devices of the user, a life and health managing profile 564 managing life information and health information of the user and for controlling related devices, a car managing profile 566 managing general status information of the car such as driving, security, and maintenance by the user, or the like.

A server-based car security service provided by the server 130 according to the current exemplary embodiment may be provided as one of a plurality of integrated M2M services provided by the integrated M2M service providing server 500. For example, the server-based car security service provided by the server 130 may be implemented by the car managing profile 566, and the car device 110 and the user device 160 may receive the server-based car security service by using the car managing profile 566 of the integrated M2M service providing server 500, as the user devices 510.

The service implementation module managing unit 560 may combine the service profiles that are individually implemented, to generate a new service profile. For example, a refrigerator managing service implemented by the home device managing profile 562 may provide a service which searches for foods stored in the refrigerator. A body fat managing service implemented by the life and health managing profile 564 may provide a service which informs users about diets for controlling their body fat. The refrigerator managing service and the body fat managing service may be implemented as separate services but the integrated M2M service providing server 500 link the refrigerator managing service and the body fat managing service so as to synergistically combine the services, e.g., foods for the diet which are helpful in controlling the user's body fat are selected from the foods currently stored in the refrigerator.

Via the common interface for mobile communication providers, established by the integrated M2M service providing server 500 and an open API for service providers, other communication providers may easily access a local network like the home network of the user devices 510. This can help foster the implementation and provision to the user devices 510 of various convergence services in which the local network of the user devices and external networks are connected and linked.

The integrated M2M service providing server 500 manages users of the local network and the user devices 510 at a level above the local network, and controls connecting and linkage systems between the local network and the external networks. Therefore, a simple usage status, in which various convergence services provided by the various service providers are separately used, may be provided to the user devices 510. In addition, a combination of services may be provided to the user devices 510 as needed.

FIG. 6 is a flowchart illustrating a method of using a server-based car security service of the car device 110, according to an exemplary embodiment.

In operation 610, the car device 110 generates current user image information of a car by using a car camera. The current user image information may include an image directly captured by the car device 110 and information about an image captured by an external camera that is linked with the car. The car device 110 may generate external image information of the car by using the car camera.

In operation 620, the car device 110 receives a signal indicating a current position of the car from a satellite, and generates current position information of the car. The car device 110 may generate GPS coordinate information generated by using a satellite signal or a map image indicating the current position of the car by using the GPS coordinate information.

In operation 630, the car device 110 transmits to the server 130 one or more of the following: current user image information, position information, and outside image information. The car device 110 may transmit to the server 130 current use information of the car including one or more of the following: current user image information, position information, and car outside image information. The current use information of the car may be transmitted from the server 130 to the user device 160 of the main user of the car, thereby providing a server-based car security service to a user.

The car device 110 may adjust the car camera's frame rate based on the current driving speed of the car obtained by measuring the current driving speed of the car based on the current position information or based on the current driving speed obtained from other driving speed measurement equipment. The higher the driving speed of the car, the higher the frame rate of the car camera, and the lower the driving speed of the car, the lower the frame rate of the car camera.

FIG. 7 is a flowchart illustrating a method of using a server-based car security service of the user device 160 according to an exemplary embodiment.

In operation 710, the user device 160 receives current use information of the car including current user image information of the car from the server 130.

The current use information of the car may include one or more of the following: current user image information, current position information, and car outside image information that the server 130 has received from the car device 110. By comparing the current user image information received by the server 130 from the car device 110 with the authorized user information that is registered at the server 130, when an unauthorized user is detected, a notification message notifying the main user of an unauthorized use of the car may be received. In response to the notification message transmitted by the server 130, notifying the main user about an unauthorized use of the car, the user device 160 may request current user information of the car to be provided to the server 130 and request to receive the same.

In operation 720, the user device 110 may transmit a request to initiate real-time monitoring of the car together with a request to provide real-time position information of the car to the server 130, in accordance with a user request. The user device 110 may render the current user image information from the server 130 and display it on a display screen. This may allow the user to determine whether or not the current user of the car is an authorized user. The user device 110 may receive various user requests such as: a request to real-time monitor, a request to additionally register an authorized user, or a request to retransmit a current user image.

In operation 730, the user device 160 may receive from the server 130 real-time position information that the server 130 has received from the car device 110. The real-time position information may include one or more of the following: a real-time satellite signal, and a real-time map image generated based on real-time GPS information received from the car device 110. Also, the user device 160 may receive from the server 130 position information created by the server 130 by directly linking a satellite signal or real-time GPS information to a map image.

Figure 8:
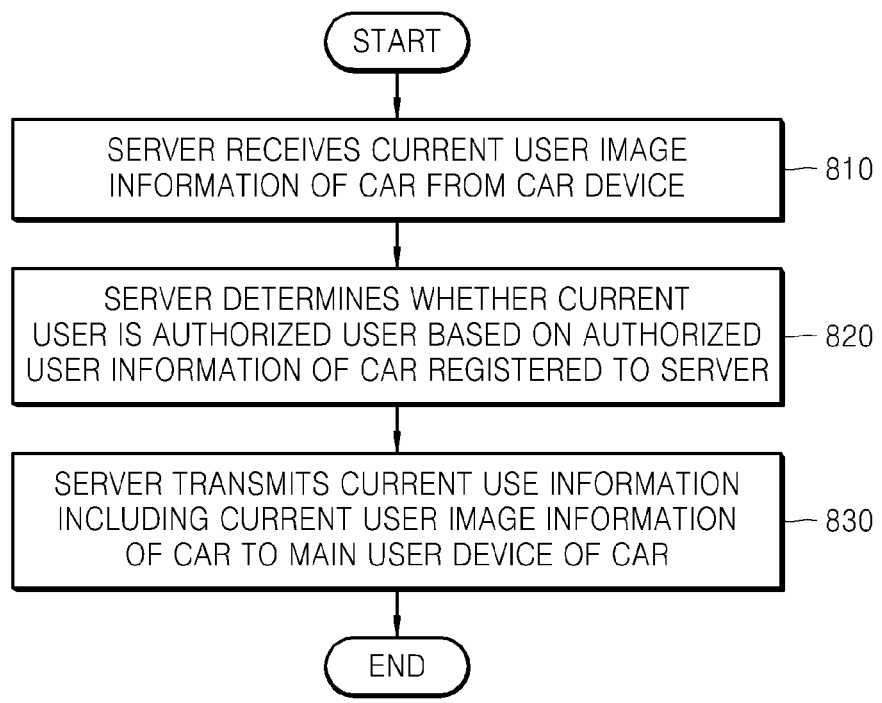
FIG. 8 is a flowchart illustrating a method of providing a server-based car security service by a server, according to an exemplary embodiment.

FIG. 8 is a flowchart illustrating a method of providing a server-based car security service of the server 130, according to an exemplary embodiment.

In operation 810, the server 130 receives current user image information including an image of a current user of the car from the car device 160.

In operation 820, the server 130 may determine whether the current user of the current user image information is an authorized user based on authorized user information of the car previously registered at the server 130.

In operation 830, based on a result of the determination of the server 130 as to whether the user of the car is an authorized user, the server 130 may transmit the current use information of the car including the current user image information to the user device 160 of the main user of the car. Accordingly, current user image information, current position information, and outside-the-car image information generated by the car device 110 may be transmitted to the user device 160 via the server 130.

Accordingly, as a server-based car security service is provided between the user device 160 which can perform network communication and the car device 110, via the server 130, the current image of the inside of the car may be reproduced via a screen of the user device 160, and thus even if the user is a long distance from the car, car theft may be prevented.

Also, even when the face recognition and determination function of the server 130 fails, or outputs an inaccurate result, a user request that is input by the user can be transmitted from the user device 160 via the server 130 to the car device 110, after the user has checked the current user image information, and thus a malfunction of the car security function can be addressed.

Also, the authorized user information of the car, which is previously stored at (i.e., is registered to) the server 130, may be corrected in response to a request by the user device 160, and thus the current user image information may be added to the authorized user information or used as learning data to improve the accuracy of the authorized user information.

In addition to the current user image information of the car, the outside-of-the-car image information may also be communicated between the user device 160 and the car device 110 via the server 130, thus providing a black box function with respect to the car.

The user devices 160 or the car device 110 may be equipped with small, limited processors as is characteristic of mobile terminals. Typically, this would make it difficult to add modules for car security, such as a face recognition and determination module. However, since the server 130 performs the processor-intensive functions for a car security service, the user devices 160 and the car device 110 need not be saddled with processor or memory intensive tasks such as face recognition and determination modules would have to perform. Also, resultant data generated by implementing a service between devices in the server 130 is transmitted to the user device 160 or the car device 110 to provide a service between devices, and thus, the application range of the user device 160 may be broadened without extending the user device 160 functionally or physically.

The exemplary embodiments can be written as computer programs and can be implemented in general-use digital computers that execute the programs using a computer readable recording medium. Examples of the non-transitory computer readable recording medium include magnetic storage media (e.g., ROM, floppy disks, hard disks, etc.), optical recording media (e.g., CD-ROMs, or DVDs), etc.

While the inventive concept has been particularly shown and described with reference to exemplary embodiments thereof, it will be understood by one familiar with this field that various changes in form and detail may be made without departing from the spirit and scope of the inventive concept as defined by the following claims. The exemplary embodiments should be considered in a descriptive sense only and not for purposes of limitation. Therefore, the scope is to be defined not by the detailed description but by the following claims, and all differences within the scope will be construed as being included in the inventive concept.

What is claimed is:

1. A method of using a car security service by a user device receiving a server-based car security service, the method comprising:
    requesting an external server to transmit current use information of a car in response to a notification message from the external server which is external to the car;
    receiving the current use information of the car, including current user image information of the car, from the external server, wherein the current user image information is generated by a car device when the car device senses that the car is being used and transmitted to the external server;
    displaying the current user image information to determine whether the current user of the car is an authorized user; and
    displaying real-time position information received by the external server from the car device in response to a user input,
    wherein the notification message is transmitted by the external server based on a result of comparing current user image information, obtained by capturing an image of a current user of the car, with authorized user information previously registered in the external server, and
    wherein the user device, the car, and the external server are all separated from each other.

2. The method of claim 1, wherein the current use information further comprises position information of the car, received by the external server from the car device.

3. The method of claim 1, wherein the current use information further comprises outside-of-the-car image information obtained by capturing an image from outside of the car, received by the external server from the car device.

4. The method of claim 1, wherein the displaying the real-time position information comprises:
    transmitting a request to initiate real-time monitoring of the car in response to a user input; and
    displaying real-time position information,
    wherein the real-time position information is created by the external server by linking real-time satellite signal or real-time GPS information received from the car device to real-time map image.

5. The method of claim 4, further comprising transmitting a warning request to the external server requesting the car device to execute a warning mode with respect to the current user.

6. The method of claim 2, further comprising outputting a map image indicating a current position of the car based on the position information, on a screen of the user device.

7. The method of claim 3, further comprising receiving the outside-of-the-car image information from the external server and outputting the outside-of-the-car image information on a screen of the user device.

8. The method of claim 1, wherein the user device of the main user comprises two or more devices.

* * * * *